Patented Nov. 7, 1944

2,362,274

UNITED STATES PATENT OFFICE 2,362,274

AQUEOUS PHENOLIC RESIN SOLUTIONS

Dee Alton Hurst, Haddonfield, N. J., assignor, by mesne assignments, to Allied Chemical & Dye Corporation, a corporation of New York No Drawing. Application August 1, 1940, Serial No. 349,236

9 Claims. (Cl. 260—30)

This invention relates to the production of aqueous solutions of phenolic resins.

It is frequently desired to apply coatings of phenolic resins, i. e. the condensation products of formaldehyde with phenolic bodies, to porous or fibrous materials. It has been attempted to coat these materials by forming the condensation products in situ, i. e., by impregnating the porous or fibrous materials with the reactants and heating to bring about the reaction, but this method has been found unsatisfactory in many cases because of the difficulty of maintaining proper proportions of reactants and proper reaction conditions thoughout the impregnated mass. Solutions of phenolic resins in organic liquids such as acetone or alcohol have also been proposed for the impregnation of porous or fibrous materials. Certain types of fibers, however, such as asbestos, cellulose and spun glass, are not readily wet by solutions of phenolic resins in organic solvents, due to the surface characteristics of the fiber and the surface tension and interfacial tension of the liquid film. These fibrous materials, which are not readily wet by organic solutions, are generally readily wet by aqueous solutions of the resins. Aqueous solutions of phenolic resins are also advantageous from an economic standpoint and this advantage is particularly important when the solutions are used on such porous surfaces as cement.

Liquid resin reaction products obtained by reaction of formaldehyde with phenolic bodies, such as the so-called tar acids obtained in the carbonization or gasification of coal, may take up a limited amount of water but dilute aqueous solutions cannot generally be prepared. For impregnation purposes it is desirable that the aqueous solutions be dilute; it is therefore desirable that the liquid resin reaction products have a high tolerance for water, i. e. form either true or colloidal solutions on high dilution with water and remain in this form at temperatures at least as low as 15° C. Only dilute aqueous mixtures which are homogeneous, i. e. are either true or colloidal solutions, have favorable characteristics for penetration of fibrous or porous material.

In order to give reaction products of formaldehyde and tar acids a sufficiently high tolerance for water to form dilute aqueous solutions, it has been proposed either to add a relatively large proportion of alkali or other material to the mixture to secure high water tolerance, or to restrict the phenolic reactant for preparing the resin to substantially pure phenol, $C_6H_5OH$. Use of high proportions of alkali or similar materials is undesirable in that it impairs the water resistance of the finally cured impregnated product. The use of substantially pure phenol as the reactant in preparing the resin is highly undesirable since it involves either the use of expensive synthetic phenol, or when tar acids are used as the source of phenol, costly separation and purification processes.

It is an object of this invention to prepare dilute aqueous solutions of phenolic resins suitable for impregnation purposes from resins which are the reaction products of formaldehyde with phenolic substances in general, e. g. cresols, xylenols, phenol containing substantial proportions of cresols and/or xylenols, and particularly the tar acid mixtures obtained in the carbonization of coal, which contain phenols, cresols and xylenols in varying proportions. It is a further object of this invention to provide a process simple to carry out for producing resin-impregnated fibrous materials of improved durability and flexibility, e. g. improved pipe shield products of the type disclosed in United States Patent 2,082,175 of June 1, 1937.

I have discovered that by reacting formaldehyde with phenolic mixtures containing 13% or more of cresols or 8% or more of xylenols, or equivalent proportions of mixtures of these various phenol homologs, e. g. tar acid mixtures obtained in the carbonization or gasification of coal, a condensation product results which, upon incorporation of a minor proportion of formaldehyde or acetaldehyde, preferably formaldehyde not exceeding 30% of the final mixture, may be dissolved in large proportions of water and, in some cases, is miscible in water in all proportions.

Dilute aqueous resin solutions thus produced, I have found, may be used for the impregnation of porous materials such as concrete, asbestos fibers, cellulose fibers and spun glass. For example, these solutions may be used for the impregnation of the sheets of fibrous materials such as paper, felt, woven or knitted cloth, wood veneer, or the like used in fabricating pipe shields in accordance with United States Patent 2,082,175.

To be suitable for impregnation purposes, aqueous solutions of phenolic resins should contain no more than about 30%, and preferably less than 20%, of the resin reaction product. For some uses, aqueous solutions containing only about 10% of the resin reaction product are desirable. The addition of as little as 1% formaldehyde to the water-resin mixture has been found advantageous in some instances to prepare an aqueous homogeneous resin solution of sufficient dilution for impregnation purposes. I have found it desirable to limit the amount of aldehyde incorporated in the aqueous solution to 30% based on the weight of the solution; preferably, from about 1% to 15% of formaldehyde is incorporated in the aqueous resin solution. An amount of formaldehyde falling within the range of 1% to 30% will invariably produce a homogeneous mixture suitable for impregnation purposes. The 1% to 30% of added formaldehyde does not include unreacted free formaldehyde remaining in the resin reaction mixture after the condensation reaction.

As above indicated, it is advantageous to use phenolic mixtures such as tar acids in preparing the resin reaction products employed in aqueous solution as impregnants. These tar acids are recovered in coal carbonization or gasification processes and it is desirable for commercial reasons to make use of the mixtures themselves without first resolving them into individual compounds. In prior art methods of preparing aqueous resin solutions, either substantially pure phenol is used as the phenolic reactant to give a resin reaction product which may be diluted sufficiently to be suitable for impregnation purposes, or a high proportion of alkali or similar undesirable constituent is incorporated in the mixture. The process of my invention, therefore, has the important advantage of making available relatively inexpensive phenolic mixtures such as tar acids in preparing aqueous resin solutions as impregnants. The phenolic reactant used in my process may consist essentially of cresol or xylenol, with little or no phenol present. Generally, however, it contains a substantial proportion of phenol, and may contain, besides cresols and xylenols, small proportions of higher phenol homologs. The phenolic reactants which I consider of importance for the process of my invention are phenolic mixtures containing at least 13% cresols or 8% xylenols, or proportionate quantities of mixtures of these various phenol homologs equivalent in effect to 13% cresols or 8% xylenols; for example, a phenolic mixture containing 6½% cresols and 4% xylenols. As above indicated, tar acid mixtures are of particular importance for the process of my invention. The term "tar acid" is used in the specification and claims to designate phenolic mixtures obtained as a by-product of coal carbonization or gasification, containing varying proportions of phenol, cresols and xylenols and higher homologs.

A resin reaction product from which aqueous solutions may be prepared in accordance with my invention is prepared by reacting a phenolic mixture as above described with formaldehyde under reflux conditions in the presence of preferably less than 1% by weight of alkali catalyst. The presence of substantially greater amounts of alkali, as above indicated, gives undesirable characteristics to the cured impregnated products. A molecular proportion of between 1 and 2 mols of formaldehyde, preferably about 1 mol, per mol of tar acid has been found advantageous. The reaction temperature is preferably in the range of about 65°-100° C. In general, the higher temperatures require shorter reaction time but the lower reaction temperatures produce resin reaction products with higher water tolerance when the reactions are carried to the same percentage consumption of formaldehyde. To obtain a resin which will produce a coated article of good quality after impregnation and curing, the reaction should be continued until no more than 4% free formaldehyde, preferably from 2 to 3%, remains in the reaction mixture. The reaction may be followed by determining the uncombined formaldehyde and the viscosity as well as the water tolerance of the resin reaction product at room temperature or below. The resin reaction products when cooled may be dissolved in water, with addition of formaldehyde or acetaldehyde, to give resin solutions having the desired resin content.

Unless the resin product is prepared for immediate use, it is preferable to keep it or the aqueous phenolic resin solution made therefrom under refrigerated conditions during transportation and storage. When these materials are allowed to stand at room temperature or above for extended periods of time, the water-compatibility of the resin tends to decrease. But even the reaction products that have been kept at room temperature and above for long periods of time and have thereby decreased in water-compatibility may be made into dilute aqueous solutions suitable for impregnation in accordance with my invention by incorporating a somewhat larger amount of aldehyde in the solution, as will appear in the examples.

Fibrous materials or other porous substances may be impregnated with aqueous resin solutions obtained as above described. As pointed out, aqueous solutions are more economical than organic solutions for impregnating purposes, and dilute aqueous solutions have penetration characteristics superior to those of viscid or non-homogeneous aqueous solutions. Furthermore, aqueous resin solutions are superior to organic solutions for the impregnation or coating of a number of fibers such as cellulose, asbestos and spun glass because of better wetting properties. The presence of the minor proportion of aldehyde, I have found, does not impair the penetration characteristics of the aqueous solution. Solutions prepared in accordance with my invention, therefore, may be employed where the use of solutions in solvents such as alcohol or acetone would be impracticable.

When the aqueous resin solutions of my invention are employed for impregnating fibrous sheets used in the fabrication of pipe shields in accordance with United States Patent 2,082,175, a sheet of the fibrous material, which may be paper, felt, woven or knitted cloth, wood veneer or the like, is saturated with the aqueous resin solution. The saturation operation may be conducted as either a batch or a continuous process. Plasticizers may be added to the solution, if desired, to impart greater flexibility to the final product.

After impregnation, water and aldehyde are evaporated from the treated materials and the resin is cured to an infusible, insoluble stage. The curing of the impregnated product is generally carried out at temperatures above 100° C. Temperatures of approximately 125° C. are generally satisfactory and temperatures up to approximately 190° C. may be used. In the impregnation of sheets of fibrous materials for the fabrication of pipe shields, after the material has been heated to drive off water and aldehyde, the resulting sheet may be subjected to heat and pressure in a platen press to cure the resin impregnant, for example, the sheet may be subjected to a pressure of about 1,000 pounds per square inch at a temperature of 160°-180° C. for approximately three minutes. There is thus formed a flexible impervious sheet, substantially homogeneous throughout and having a hard, tough, substantially impervious surface. If desired, the pipe shields may be built up from a number of laminations of impregnated materials, either similar or dissimilar materials being used for different laminations. The aqueous resin solutions of my invention may also be used to impregnate reinforcing elements which are to be incorporated in the pipe shields. Materials suitable for fabrication of the reinforcing elements include woven or knitted fabrics, nettings, muslin and other textiles, felted materials such as paper, roofing felt and asbestos felt, wire cloth or screen, woven or sheet asbestos and wood veneer. These elements are impregnated and cured similarly to the fibrous sheets used in fabricating the pipe shields. The various sheets and elements making up the pipe shields may be bonded to each other by subjecting a composite structure of the several elements to the curing operation under heat and pressure in a mold or platen.

The use of the aqueous resin solutions of my invention for impregnation results, after curing, in the production of coated materials of good strength, hardness and water resistance. When prior art aqueous impregnating solutions are used, in which a high proportion of alkali or other material has been incorporated to make the resin water-compatible, an inferior coated material, lacking in water resistance, is obtained. The formaldehyde, added to make the resins water-compatible in accordance with my invention, is largely driven off during curing. A small part of the formaldehyde may, however, react with the resin during the curing operation. Whatever the mechanism of the curing process, the cured product has the superior physical properties above indicated.

The terms "homogeneous" and "resin solutions," as applied to water-resin mixtures in the specification and claims, are intended to designate aqueous solutions that are either true solutions or colloidal solutions and are accordingly suitable for impregnation purposes.

The following examples are illustrative of the process of my invention. All parts are by weight.

*Example 1.*—Tar acid containing 37.5% phenol and 62.5% meta-para-cresol was reacted with an equimolecular proportion of 37% formaldehyde in the presence of .585% NaOH based on the total weight of the reactants, at 70° C. The course of the reaction was followed by determining the free formaldehyde content of the reaction mixture. The reaction was discontinued after fifty minutes, when the reaction mixture contained 2.4% of free formaldehyde. A dilute aqueous solution in which the resin reaction product constituted 30% of the solution was prepared by incorporating about 9% formaldehyde in the solution. The resin reaction product of this example could also be dissolved in all proportions in water which contained about 15% formaldehyde. Dilute aqueous solutions thus prepared, when used for impregnation purposes, were found to give coated products of high quality.

*Example 2.*—The same tar acid as in Example 1 was reacted with an equimolecular proportion of 37% formaldehyde in the presence of .48% NaOH based on the total weight of the reactants. The reaction was discontinued after one and one-half hours, when the free formaldehyde in the reaction product reached 2.5%. By incorporating about 11% formaldehyde in the solution, a solution was obtained in which the resin reaction product constituted about 30% of the solution. The resin reaction product of this example was also found to be miscible in all proportions in water containing about 15% formaldehyde. These dilute aqueous solutions were found suitable for the production of coated materials of high quality by impregnation.

*Example 3.*—200 parts of a tar acid containing 82% phenol, 15% cresols and 3% xylenols were reacted with 160 parts of 37% formaldehyde in the presence of 11 parts of 10% sodium hydroxide solution for four hours at 70° C. It was found that a dilute aqueous solution in which the resin reaction product constituted about 20% of the solution could be prepared by adding formaldehyde in the amount of about 9% of the mixture. It was further found that this resin reaction product was miscible in all proportions with water containing about 14.5% formaldehyde. Materials impregnated with the dilute aqueous solutions thus prepared when cured at a temperature of about 125° C. gave coated products of high strength, hardness and water-resistance.

*Example 4.*—Meta-para-cresol having a boiling range of 200°–204° C. was reacted with an equimolecular proportion of 37% formaldehyde in the presence of .61% NaOH by weight based on the total weight of the reactants. After one-half hour of reaction at 70° C., a resin reaction product was obtained which at 15° C., upon incorporating about 15% formaldehyde in the solution, could be made into a dilute aqueous resin solution in which the resin reaction product constituted about 30% of the solution.

This reaction product was allowed to stand for one week at 25°–30° C. The resulting product was able to form dilute aqueous solutions consisting of about 70% added water upon the addition of about 18% formaldehyde, based on the weight of the solution produced.

*Example 5.*—A tar acid mixture containing 50% phenol and 50% meta-para-cresol was reacted with an equimolecular proportion of 37% formaldehyde in the preence of .51% NaOH at 70° C. until the resulting reaction mixture contained only 2.3% free formaldehyde. With the addition of about 8% formaldehyde, based on the weight of the solution, there was prepared a dilute aqueous solution in which the resin reaction product constituted about 30% of the solution. By incorporating about 12% formaldehyde in the solution, it was possible to prepare a dilute aqueous solution in which the resin reaction product constituted 12% or less of the solution.

The resin reaction product prepared by the process of this Example, upon standing for five days at 27°–32° C., gave a dilute aqueous solution in which the aged resin reaction product constituted about 30% of the solution, upon incorporation of about 11% formaldehyde in the solution.

*Example 6.*—A tar acid mixture containing 62% phenol and 38% meta-para-cresol was reacted with an equimolecular amount of 37% formaldehyde in the presence of .47% NaOH for one and three-quarter hours at 70° C. This resin reaction product was miscible in all proportions in water containing about 10% formaldehyde. Dilute aqueous solutions could thus be formed which were suitable for the preparation of coated materials of high quality by impregnation.

*Example 7.*—A tar acid, as in Example 6, was reacted with an equimolecular amount of 37% formaldehyde in the presence of .47% NaOH for twenty minutes at 100° C. By incorporating about 13.5% formaldehyde in the solution, a dilute aqueous solution of this resin, suitable for impregnation purposes, could be prepared in which the resin reaction product constituted about 30% of the solution.

*Example 8.*—A tar acid mixture containing 15% phenol, 58% cresols and 27% xylenols was reacted for one hour at 70° C. with an equimolecular proportion of 37% formaldehyde in the presence of .26% NaOH. By incorporating about 15% formaldehyde in the solution a dilute aqueous solution suitable for impregnation purposes was prepared in which the resin reaction product constituted about 30% of the solution.

*Example 9.*—A tar acid mixture containing approximately 3% phenol, 73% cresols and 24% xylenols was reacted for one hour at 70° C. with an equimolecular proportion of 37% formaldehyde in the presence of 1.26% NaOH. By incorporating about 17% formaldehyde in the solution a dilute aqueous solution suitable for impregnation purposes was prepared in which the resin reaction product constituted about 30% of the solution.

Since certain changes may be made in carrying out the above process without departing from the scope of the invention, it is intended that all matter contained in the above description shall be interpreted as illustrative and not in a limiting sense.

I claim:

1. A process for preparing aqueous phenolic resin solutions which comprises reacting formaldehyde with a tar acid containing at least 13% cresols, and mixing the resultant reaction product with water and formaldehyde to form a solution containing no more than about 30% of the resin reaction product and an amount of formaldehyde at least sufficient to make the mixture homogeneous.

2. A process for preparing aqueous phenolic resin solutions which comprises reacting formaldehyde with a tar acid containing at least 8% xylenols, and mixing the resultant reaction product with water and formaldehyde to form a solution containing no more than about 30% of the resin reaction product and an amount of formaldehyde at least sufficient to make the mixture homogeneous.

3. A process for production of aqueous phenolic resin solutions which comprises reacting a tar acid containing at least 13% cresols with formaldehyde in the proportion of about 1 to 2 mols of formaldehyde per mol of tar acid in the presence of less than 1% by weight of alkali at a temperature of about 65°-100° C., and mixing the reaction product thus obtained with water and formaldehyde to form a solution containing not more than about 30% of the resin reaction product and from about 1% to 30% formaldehyde.

4. A process for production of aqueous phenolic resin solutions which comprises reacting a tar acid containing at least 8% xylenols with formaldehyde in the proportion of about 1 to 2 mols of formaldehyde per mol of tar acid in the presence of less than 1% by weight of alkali at a temperature of about 65°-100° C., and mixing the reaction product thus obtained with water and formaldehyde to form a solution containing not more than about 30% of the resin reaction product and from about 1% to 30% formaldehyde.

5. A process for preparing aqueous phenolic resin solutions which comprises reacting formaldehyde with a methylphenol reactant selected from the group consisting of (a) phenolic material containing at least 13% by weight of cresol and substantially free from other substitution products of phenol, (b) phenolic material containing at least 8% by weight of xylenol and substantially free from other substitution products of phenol and (c) phenolic material containing proportionately smaller minimum amounts of both cresol and xylenol and substantially free from other substitution products of phenol, and mixing the resultant reaction product with water and an amount of aldehyde selected from the group formaldehyde and acetaldehyde at least sufficient to produce a homogeneous mixture containing not more than about 30% of the resin reaction product.

6. A process for production of aqueous phenolic resin solutions which comprises reacting a methylphenol reactant with formaldehyde in the proportion of about 1 to 2 mols of formaldehyde per mol of phenolic substance in the presence of less than 1% by weight of alkali at a temperature of about 65° to 100° C., said methylphenol reactant being selected from the group consisting of (a) phenolic material containing at least 13% by weight of cresol and substantially free from other substitution products of phenol, (b) phenolic material containing at least 8% by weight of xylenol and substantially free from other substitution products of phenol and (c) phenolic material containing proportionately smaller minimum amounts of both cresol and xylenol and substantially free from other substitution products of phenol, and mixing the reaction product thus obtained with water and formaldehyde to form a solution containing not more than about 30% of the resin reaction product and an amount of formaldehyde at least sufficient to make the mixture homogeneous.

7. A process for production of aqueous phenolic resin solutions which comprises reacting a methylphenol reactant with formaldehyde in substantially equimolecular proportions of formaldehyde and phenolic substance in the presence of less than 1% by weight of alkali at a temperature of about 65° to 100° C. for a period of no more than about 3½ hours, said methylphenol reactant being selected from the group consisting of (a) phenolic material containing at least 13% by weight of cresol and substantially free from other substitution products of phenol, (b) phenolic material containing at least 8% by weight of xylenol and substantially free from other substitution products of phenol and (c) phenolic material containing proportionately smaller minimum amounts of both cresol and xylenol and substantially free from other substitution products of phenol, and mixing the reaction product thus obtained with water and formaldehyde to form a solution containing not more than about 20% of the resin reaction product and from about 1% to 30% formaldehyde.

8. An aqueous phenolic resin solution comprising water, an amount of formaldehyde at least sufficient to make the mixture homogeneous and not more than 30% of a reaction product of formaldehyde with a methylphenol reactant selected from the group consisting of (a) phenolic material containing at least 13% by weight of cresol and substantially free from other substitution products of phenol, (b) phenolic material containing at least 8% by weight of xylenol and substantially free from other substitution products of phenol and (c) phenolic material containing proportionately smaller minimum amounts of both cresol and xylenol and substantially free from other substitution products of phenol.

9. An aqueous phenolic resin solution comprising water, an amount of formaldehyde at least sufficient to make the mixture homogeneous and not more than 30% of a product made by reacting formaldehyde with a methylphenol reactant in the proportion of about 1 to 2 mols of formaldehyde per mol of phenolic substance in the presence of less than about 1% by weight of alkali at a temperature of about 65° to 100° C., said methylphenol reactant being selected from the group consisting of (a) phenolic material containing at least 13% by weight of cresol and substantially free from other substitution products of phenol, (b) phenolic material containing at least 8% by weight of xylenol and substantially free from other substitution products of phenol and (c) phenolic material containing proportionately smaller minimum amounts of both cresol and xylenol and substantially free from other substitution products of phenol.

DEE ALTON HURST.